United States Patent

[11] 3,549,952

| [72] | Inventor | Jean Sole<br>Clamart, France |
|------|----------|------------------------------|
| [21] | Appl. No. | 654,104 |
| [22] | Filed | July 18, 1967 |
| [45] | Patented | Dec. 22, 1970 |
| [73] | Assignee | Commissariat A L'Energie Atomique<br>Paris, France |
| [32] | Priority | July 20, 1966 |
| [33] | | France |
| [31] | | No. 70 148 |

[54] ELECTROMAGNETIC SUPERCONDUCTING ACCUMULATOR DEVICE AND METHOD FOR ACCUMULATING ELECTRICAL ENERGY
23 Claims, 5 Drawing Figs.

[52] U.S. Cl. .................................................. 317/123,
335/216
[51] Int. Cl. ..................................................... H01v 11/00
[50] Field of Search .......................................... 323/44FISC;
340/173.1; 335/216; 317/123S;
307/212, 245, 277, 306

[56] References Cited
UNITED STATES PATENTS

| 3,277,322 | 11/1966 | Berlincourt ................ | 317/123X |
| 3,143,720 | 8/1964 | Rogers ...................... | 323/44UX |
| 3,158,792 | 11/1964 | Swartz ....................... | 317/123UX |
| 3,228,011 | 1/1966 | Crane ........................ | 340/173.1 |
| 3,252,018 | 5/1966 | Drautman ................... | 335/216X |
| 3,339,165 | 8/1969 | Garwin ...................... | 307/245X |

*Primary Examiner*—J. D. Miller
*Assistant Examiner*—William J. Smith
*Attorney*—Craig, Antonelli, Stewart & Hill ABSTRACT: The present disclosure relates to an electromagnetic accumulator device comprising a superconducting circuit having a closed configuration and an external supply circuit. More particularly, the present disclosure concerns the trapping of electrical energy in a superconducting circuit where it is stored and maintained without loss of energy until the time of its controlled release into a load circuit.

INVENTOR
JEAN SOLE

BY Paul M. Craig Jr.
ATTORNEY

INVENTOR
JEAN SOLE
BY Paul M. Craig, Jr.
ATTORNEY

ELECTROMAGNETIC SUPERCONDUCTING ACCUMULATOR DEVICE AND METHOD FOR ACCUMULATING ELECTRICAL ENERGY

BACKGROUND OF THE INVENTION

The present invention relates to an electromagnetic accumulator device comprising a superconducting circuit wherein the current and the magnetic flux stored in a first circuit are maintained without loss of energy until the time of their controlled release into another circuit which is associated with said first circuit. The present invention is also concerned with the method for accumulating electrical energy.

In order to trap an electric current in a superconducting circuit, it is known that a circuit constructed in the form of a coil obtained by winding consecutive turns of wires, cables, metallic ribbon, strips of foil and the like can be used. A winding of this type, which is similar to those employed in conventional electrical engineering applications using ordinary conductors, makes it possible, when the material is superconducting, to produce a permanent magnetic field of high strength or to trap large electric energies from relatively weak currents.

However, a conventional winding has a number of disadvantages. For example, the different turns of the winding are connected in series. Thus, if a transition from the superconducting state to the normal state takes place locally at any one point of the winding, there is consequently a local interruption of said winding. The Joule effect which appears at this point has a tendency to propagate within the superconducting circuit, with the result that the electromagnetic energy which is stored therein is dissipated in the form of heat. Windings of this type thus exhibit an unstable behavior.

Various expedients can be adopted for the purpose of attenuating the above-mentioned drawback. In particular, the superconducting wire or ribbon can be covered with a metal jacket which is capable of sustaining, without excessive heating, the full current density which the superconductor can carry. Should a local magnetic transition to the normal state take place in the superconductor, its electrical resistance at this point becomes higher than that of the metal jacket which has the effect of shunting the current while the internal wire or core, which no longer exhibits a Joule effect, is permitted to revert to the superconducting state. Other low-resistance shunts can also be employed, especially by connecting superconducting wires or ribbons in parallel with ordinary metallic wires, or by forming the coils by means of a number of independent and separately fed windings. Alternatively, in the case of a winding which is intended for the production of strong magnetic fields, it is possible to make use of a frame made up of massive conductive parts which, in the event of local transition of the superconducting wire to the normal phase, attenuates any variations of the magnetic field by means of induced currents within the frame.

However, the various means mentioned above cannot always be effectively applied in practice and have the further disadvantage of being both complicated and costly. Moreover, they present problems of insulation, particularly when establishing connections which are intended on the one hand to close the superconducting circuit in a loop for the purpose of trapping the current and, on the other hand, to connect this circuit to a current supply source.

SUMMARY OF THE INVENTION

It is an object of the present invention to avoid the prior art disadvantages in electromagnetic accumulator devices.

Another object of the present invention is to provide an improved electromagnetic accumulator device wherein the superconducting circuit which is employed to trap an electrical current is not directly connected to the external supply circuit.

A further object of the present invention is to provide an improved method for accumulating electrical energy wherein said energy is stored in a conducting circuit which is maintained in a superconductive state.

A still further object of the present invention is to provide an electromagnetic accumulator device wherein the stability of the circuits are substantially improved and said circuits can be employed for the purpose of trapping intense currents which produce high values of magnetic flux.

And yet another object of the present invention is to trap very high currents which are substantially larger than those obtained by means of conventional coils while at the same time employing a smaller quantity of superconducting material.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved electromagnetic accumulator device and method of accumulating electrical energy may be obtained by utilizing a superconducting circuit formed of at least one superconducting layer having a closed-loop configuration and by providing means for producing a moving magnetic field in the vicinity of said superconducting circuit.

The present invention will become fully understood from the detailed description hereinbelow and the accompanying drawings which are given by way of illustration only and thus are not limitative of the present invention and wherein.

Figure 1:
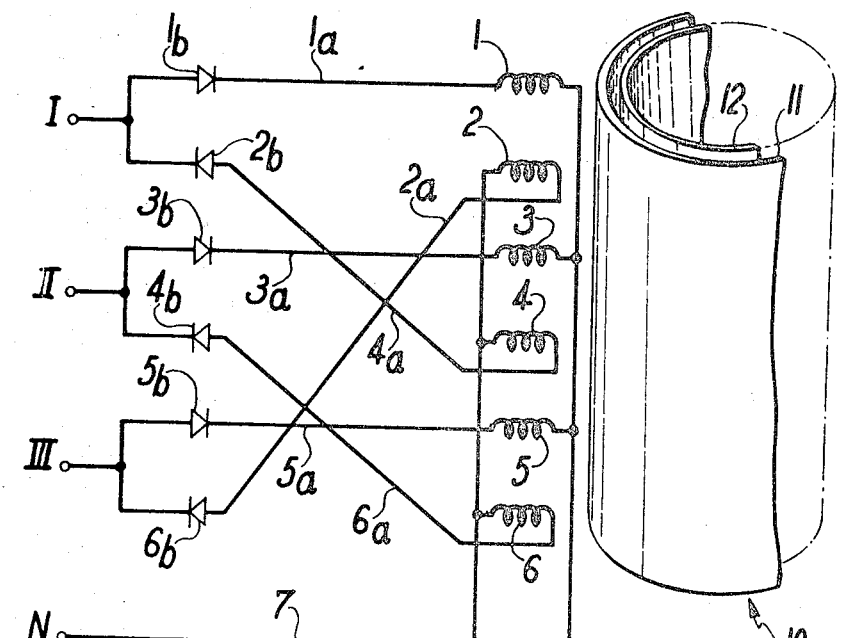
FIG. 1 is the general arrangement of the electromagnetic accumulator device of the present invention.

From FIG. 1, it is apparent that the electromagnetic accumulator device which is illustrated comprises a superconducting circuit 10 in which it is desired to trap a given electric current, said circuit being formed of two coaxial cylindrical layers or sheets 11 and 12 which are independent of each other and completely closed. This superconducting circuit is associated with a supply circuit which produces a moving magnetic field whereby an induced electric current can be generated within the superconducting circuit. Said supply circuit comprises six conventional electromagnetic coils as designated in the drawings by the reference numerals 1 to 6 which are mounted as indicated in the FIG.

Figure 2:
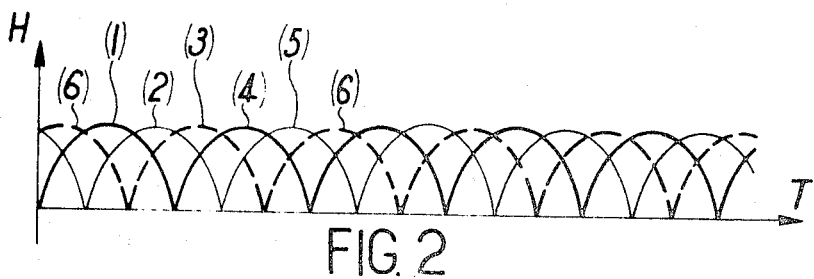
FIG. 2 is a diagram showing the magnetic field of the supply circuit having a form as a function of time, the time values being plotted as the abscissae and the magnetic field which is produced by the supply circuit forming part of the device shown in FIG. 1, being plotted as the ordinate.

The coils referred to are connected at one end by means of electric conductors $1a$ to $6a$ to rectifiers $1b$ to $6b$. Said rectifiers are connected together in pairs and mounted in opposite directions, the common point of each pair being connected to one of the phases I, II or III of a conventional three-phase supply. The other ends of the coils 1 to 6 are connected to a common conductor 7 which is connected to the neutral point N of the supply. By virtue of this mode of connection, the coils 2, 4 and 6 are connected in opposite directions with respect to the coils 1, 3 and 5, and the complete assembly is supplied with alternating currents which are displaced in time and suitably rectified. Said coils thus produce a magnetic field having a form as a function of time as shown in FIG. 2. This field is a drifting field which undergoes translational motion in the direction of the curves 1 to 6, each curve of the diagram being followed by an index corresponding to that of the coil through which a given rectified current flows.

At each instant, the magnetic field produced traverses the superconducting circuit 10 and, with respect to a suitable value of said field, initiates the local transition of this circuit to a zone which moves with the magnetic field. On the well-known principle of flux pumps, the above-mentioned displacement of a local transition zone accordingly effects the introduction into the superconducting circuit of an electric current which remains trapped therein. This current in turn supplies a magnetic field which remains constant as long as the trapped current is maintained at its value.

As an advantageous feature of the present invention, a number of secondary arrangements which are known can be contemplated in conjunction with the arrangement, especially for the purpose of improving the penetration of the drifting magnetic field through the superconducting circuit. Thus, another physical effect can be associated with the magnetic field and comprise localized heating which can be provided along the superconducting circuit and displaced in synchronism with the magnetic field. The heating referred to can be obtained either by conduction or radiation, or by means of light or infrared beams associated, for example, with the electromagnetic coils which produce the drifting field, provisions being also made, if necessary, for the relative forward displacement or lead of the heating means which would take into account the inertia of the thermal process. It is also possible to carry out uniform heating of the superconducting circuit or to subject the superconducting circuit to a constant additional magnetic field so as to bring the circuit very close to the critical conditions of transition from the superconducting state to the normal state. Thus, the local transition of the moving zone of the superconducting circuit which is reached by the moving magnetic field would take place in a more positive manner and permit more effective trapping of the current within the superconducting circuit.

The superconducting circuit 10 according to the present invention can be composed of any number of completely closed layers in superimposed coaxial relationship and any suitable insulating material can be placed between these layers, if desired. Further, alternative forms may also be contemplated wherein the coil circuit which serves to produce the moving magnetic field can be arranged in a different manner and provisions can be made, in particular, for a plurality of identical coil circuits. Furthermore, instead of using three-phase current supplies, polyphase supplies can be used, connection to the main network being either by means of a Y-system as in FIG. 1 or a delta system. Also, the coils can comprise magnetic cores, for example, the lap-wound type as in the stator of an alternator. In addition, a large number of variants which are already known can be contemplated for the coil assembly. For example, each coil can be subdivided into two identical half-coils disposed on each side of the superconducting layers. Also, the number of these coils can be variable and the frequency of the polyphase currents can be adjustable. Finally, the amplitude of the magnetizing current can be modulated as a function of the position of the coils and these coils can be placed either externally or internally of the circuit, or both externally and internally.

Figure 3:
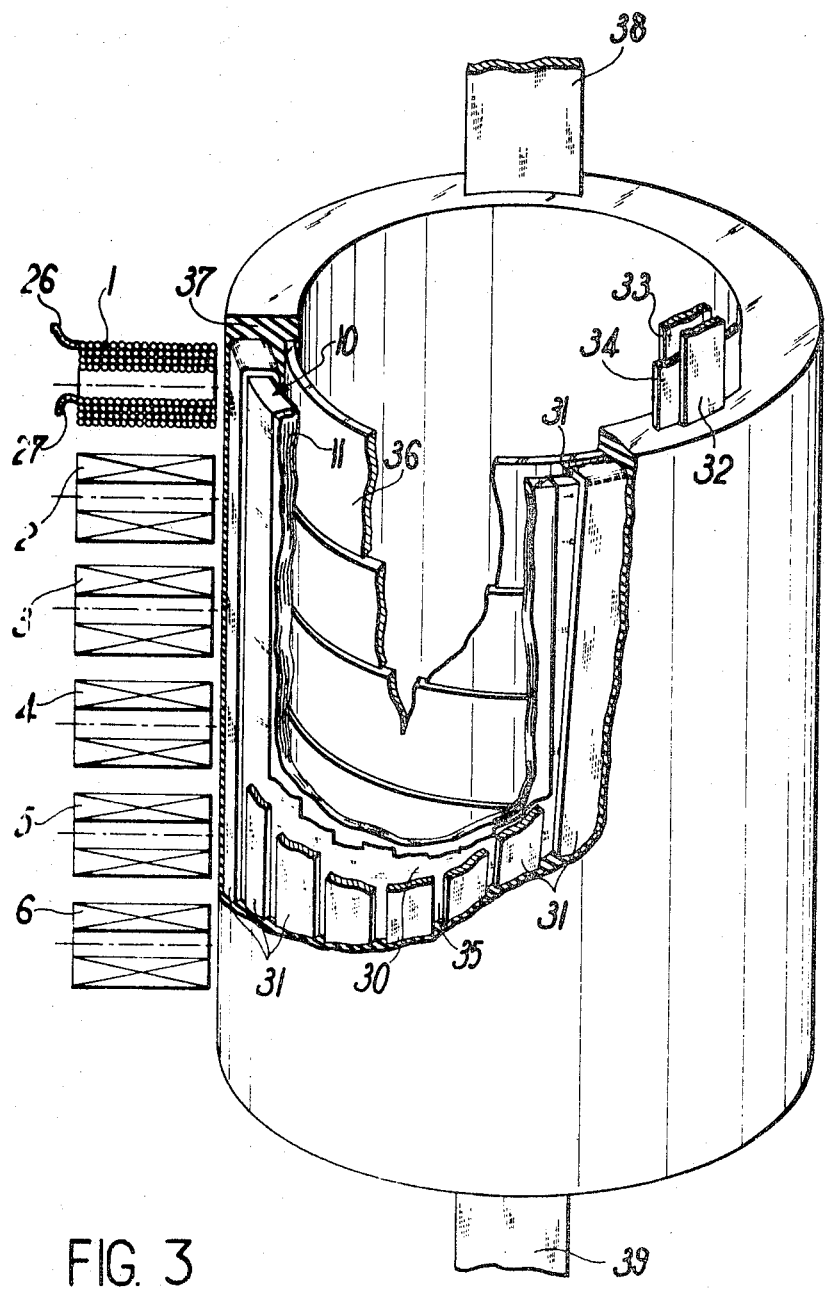
FIG. 3 shows a larger and more detailed construction of the electromagnetic accumulator device.

FIG. 3 shows, in greater detail, the particular structure of the electromagnetic accumulator device of the present invention, the principle of operation of which having been set forth in reference to FIGS. 1 and 2 above.

There are again shown in FIG. 3 the six supply coils 1—6 which are intended to produce a drifting magnetic field, one of these coils 1 being shown in axial cross section, the ends 26 and 27 of its winding being apparent and intended to be connected to a suitable supply circuit in the manner indicated in FIG. 1.

For enhanced clarity of the illustration of FIG. 3, the superconducting circuit 10 is shown as composed of only a single superconducting layer or sheet 11 which is completely closed and has the configuration of a right cylinder. Said layer is surrounded by a suitable insulating electric covering 30 which is associated on its outside surface with a conductive strip or ribbon 31, preferably made of copper, which is wound over the insulating electric covering so as to surround the superconducting sheet 11 over both its outer and inner surfaces. The two ends 32 and 33 of the conductive ribbon 31 are separated from each other by an insulating plate 34, each turn of the ribbon being also separated with respect to the adjacent turn by a space 35 in such a manner that the ribbon constitutes a continuous electric circuit around the superconducting layer 11. As will be explained hereinafter, the design function of said circuit is to induce a transition throughout the surface of said layer at the moment when it is necessary to release into an external load circuit 36 the electric energy which has been previously trapped. As a preferred feature of the present invention, the winding of said load circuit 36 comprises a conventional coil of copper or aluminum wire or ribbon and can be located either inside or outside the cylinder which is formed by the superconducting layer 11, its insulating covering 30 and the trigger circuit formed by the conductive ribbon 31. The assembly which is formed on the one hand by the superconducting layer and its trigger circuit and on the other hand by the load circuit 36 can be embedded within an insulating mass 37 and the ends 38 and 39 of the circuit 36 which extend therefrom are connected to any other suitable circuit (not shown in the drawings).

The trigger circuit which is formed by the conductive ribbon 31 serves to produce action by the Joule effect on the temperature of the superconducting layer 11 and/or to generate therein a triggering magnetic pulse. The total transition of the layer 11 from the superconducting state to the resulting normal state with respect to a suitable value of current which flows through the conductive ribbon 31, makes it possible for practically the entire quantity of energy which has been trapped in said layer to be transferred to the load circuit 36.

A number of different alternatives can be contemplated, especially with respect to the nature of the electric insulating material which covers the layer 11 or more generally of the entire superconducting circuit 10. For example, it may be desirable to utilize materials possessing good heat conductivity such as alumina. Also, the conducting circuits 31 and 36 as well as the insulating coverings 30 and 37 can be made by any one of a variety of methods, in particular by the application of successive coats of conductive and insulating layers respectively. The circuit 36 can be entirely separated from the superconducting circuit 10 inasmuch as it is employed only for the purpose of transferring energy which is trapped in the superconducting layer.

Figure 4:
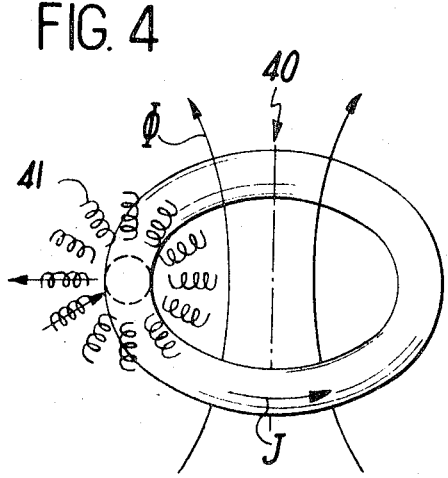
FIGS. 4 and 5 illustrate two alternative forms of the electromagnetic accumulator device of FIG. 1.
Figure 5:
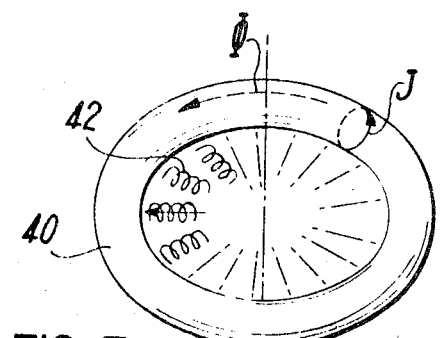

In the example which is illustrated in FIGS. 1 and 3, the superconducting circuit 10 is presented in the form of layers having the general configuration of coaxial cylinders. However, it is apparent that other alternative structures could be contemplated, for example, as shown in FIGS. 4 and 5. In FIG. 4, the superconducting circuit 40 has the geometrical shape of a torus in which the flux and the current J which are trapped and oriented as shown by the arrows are created by an assembly of external coils such as 41 and disposed in a plane which passes through the axis of the torus 40. In FIG. 5, the same torus 40 is associated with coils 42 which are disposed in a plane of symmetry at right angles to the torus, the current J and the flux having correspondingly different orientations in this example.

Whatever arrangement is adopted, the different superconducting sheets having closed-loop configurations can be constructed from different materials or from materials having different properties and chosen as a function of their positions in the circuit. In particular, the sheets can be formed by means of massive materials having anisotropic properties such that they behave in exactly the same manner as a juxtaposition or superposition of isotropic superconducting sheets or anisotropic superconducting sheets providing a preferential direction for the flow of current.

The electromagnetic accumulator device of the present invention has many advantages such as that arising from the simplicity of construction of a superconducting circuit wherein use is made of closed-loop sheets associated with a circuit which produces a moving magnetic field, and wherein any need for direct connections between the superconducting circuit and a current generator is dispensed with. Accordingly, the stability of the circuits is substantially improved and said circuits can be employed for the purpose of trapping intense currents which produce high values of magnetic flux. Furthermore, since the critical field of thin superconducting layers is higher than that of massive elements, the apparatus of the present invention makes it possible to dispose said layers in a configuration such that the magnetic field on the surface can be limited to a low value. By making use of cylindrical surfaces of large diameter, it is thus possible to trap very high currents which are substantially larger than those obtained by means of conventional coils while at the same time employing a smaller quantity of superconducting material.

Since modifications of this invention will be apparent to those skilled in the art, it is not desired to limit the invention to the exact constitution shown and described. Accordingly, all suitable modifications and equivalents may be resorted to which fall within the scope of the appended claims.

I claim:

1. An electromagnetic accumulator device comprising a superconducting circuit formed of at least one superconducting sheet of substantially cylindrical shape having a closed-loop configuration, said sheet being surrounded by an insulating covering and associated with a coil comprising an electric conductor which is wound on the covering both internally and externally of said covering, said superconducting circuit also being associated with an independent load circuit for releasing energy, said circuit comprising a coil which is wound from a metallic conductor, and an external supply circuit for producing a moving magnetic field in moving localized zones of normal conductivity in the superconducting sheet so as to build up the field and current within the closed loop, said external supply circuit being not directly connected to said superconducting circuit.

2. The electromagnetic accumulator device of claim 1, wherein the superconducting circuit comprises a plurality of independent adjacent sheets which are separated by insulating sheets.

3. The electromagnetic accumulator device of claim 1, wherein the superconducting circuit comprises a plurality of coaxial substantially cylindrical superconducting sheets which are independent of each other and completely closed.

4. The electromagnetic accumulator device of claim 1, wherein the external supply circuit for producing a moving magnetic field comprises electromagnetic coils supplied with rectified polyphase alternating currents which are displaced in time.

5. The electromagnetic accumulator device of claim 4, wherein the polyphase supply is connected to a main network by a Y-system or a delta system.

6. The electromagnetic accumulator device of claim 1, wherein the external supply circuit comprises a number of electromagnetic coils.

7. The electromagnetic accumulator device of claim 6, wherein adjacent electromagnetic coils are connected in opposite directions with respect to each other and provided with rectified polyphase alternating currents which are displaced in time.

8. The electromagnetic accumulator device of claim 7 wherein the polyphase supply is a three-phase current supply.

9. The electromagnetic accumulator device of claim 3, wherein the insulating material is disposed between the coaxial substantially cylindrical sheets.

10. The electromagnetic accumulator device of claim 1, wherein the external supply circuit is a plurality of identical coil circuits.

11. The electromagnetic accumulator device of claim 6, wherein the electromagnetic coils are placed externally and internally of the circuit.

12. The electromagnetic accumulator device of claim 6, wherein the electromagnetic coils are placed externally or internally of the circuit.

13. The electromagnetic accumulator device of claim 1, wherein the electric conductor is copper.

14. The electromagnetic accumulator device of claim 1, wherein each turn of the electric conductor is spaced apart from adjacent turns and constitutes a continuous electric circuit around the superconducting sheet.

15. The electromagnetic accumulator device of claim 1, wherein the free ends of the electric conductor are separated by an insulating plate.

16. The electromagnetic accumulator device of claim 1, wherein the winding of said load circuit is a coil selected from the group consisting of copper and aluminum ribbon and is located outside or inside the closed configuration formed by the superconducting sheet, the insulating covering and the trigger circuit formed by the electric conductor.

17. The electromagnetic accumulator device of claim 1, wherein the superconducting layer, the electric conductor, and the load circuit are embedded within an insulating mass and the load circuit is provided with ends which extend from said insulating mass and connect with any other suitable circuit.

18. The electromagnetic accumulator device of claim 1, wherein the insulating covering is made of a material which possesses good heat conductivity.

19. The electromagnetic accumulator device of claim 18 wherein the insulating covering is aluminum.

20. The electromagnetic accumulator device of claim 1, wherein the load circuit is separated from the superconducting circuit.

21. The electromagnetic accumulator device of claim 1, wherein the superconducting circuit has the geometrical shape of a torus, said external supply circuit for producing the moving magnetic field being disposed in a plane which passes through the axis of said torus.

22. The electromagnetic accumulator device of claim 1, wherein the superconducting circuit has the geometrical shape of a torus, said external supply circuit for producing the moving magnetic field being disposed in a plane of symmetry of said torus which is perpendicular to its axis.

23. The electromagnetic accumulator device of claim 1 wherein the external supply circuit produces a moving magnetic field substantially perpendicular to the wall of the superconducting sheet and the independent load circuit releases energy which is trapped in said superconducting circuit as a result of a transition of the circuit from the superconductive state to the normal state.